United States Patent
Morris et al.

(10) Patent No.: US 9,463,831 B2
(45) Date of Patent: Oct. 11, 2016

(54) ELASTIC TUBE ALIGNMENT AND FASTENING SYSTEM FOR PROVIDING PRECISE ALIGNMENT AND FASTENING OF COMPONENTS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/021,282

(22) Filed: Sep. 9, 2013

(65) Prior Publication Data

US 2015/0069779 A1    Mar. 12, 2015

(51) Int. Cl.
   *B62D 27/04* (2006.01)
   *B62D 27/06* (2006.01)

(52) U.S. Cl.
   CPC ............ *B62D 27/04* (2013.01); *B62D 27/065* (2013.01); *Y10T 29/53* (2015.01)

(58) Field of Classification Search
   CPC .... B25B 27/14; B62D 27/04; B62D 27/065; Y10T 29/53
   See application file for complete search history.

(56) References Cited

U.S. PATENT DOCUMENTS

| | | |
|---|---|---|
| 419,358 A | 1/1890 | Raymond et al. |
| 1,219,398 A | 3/1917 | Huntsman |
| 1,261,036 A | 4/1918 | Kerns |

(Continued)

FOREIGN PATENT DOCUMENTS

| | | |
|---|---|---|
| BE | 842302 A | 9/1976 |
| CN | 1036250 A | 10/1989 |

(Continued)

OTHER PUBLICATIONS

"An Anti Backlash Two-Part Shaft Coupling With Interlocking Elastically Averaged Teeth" by Mahadevan Balasubramaniam, Edmund Golaski, Seung-Kil Son, Krishnan Sriram, and Alexander Slocum, Precision Engineering, V. 26, No. 3, Elsevier Publishing, Jul. 2002.

(Continued)

*Primary Examiner* — Glenn Dayoan
*Assistant Examiner* — Melissa A Black
(74) *Attorney, Agent, or Firm* — Cantor Colburn LLP

(57) ABSTRACT

An elastically averaged alignment system includes a first component having a first alignment member, an attachment element, and a support element, and a second component having a second alignment member, an alignment aperture, and an engagement surface that engages with the support element. The attachment element includes an attachment portion and an elastically deformable alignment element portion. The elastically deformable alignment element portion is configured and disposed to interferingly, deformably and matingly engage the alignment aperture. The attachment portion includes a hollow tube having a first wall thickness, and the elastically deformable alignment element portion includes a hollow tube having a second wall thickness less than the first wall thickness. Portions of the elastically deformable alignment element portion when inserted into the alignment aperture elastically deform to an elastically averaged final configuration that aligns the first alignment member with the second alignment member in at least two planar orthogonal directions.

20 Claims, 7 Drawing Sheets

(56) References Cited

U.S. PATENT DOCUMENTS

| | | |
|---|---|---|
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 1,999,990 A | 4/1935 | Carr |
| 2,006,525 A | 7/1935 | Thal |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyl |
| 3,905,570 A | 9/1975 | Nieuwveld |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,213,675 A | 7/1980 | Pilhall |
| 4,237,573 A | 12/1980 | Weihrauch |
| 4,267,680 A | 5/1981 | Delattre |
| 4,300,851 A | 11/1981 | Thelander |
| 4,313,609 A | 2/1982 | Clements |
| 4,314,417 A | 2/1982 | Cain |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,407,413 A | 10/1983 | Jansson |
| 4,477,142 A | 10/1984 | Cooper |
| 4,481,160 A | 11/1984 | Bree |
| 4,527,760 A | 7/1985 | Salacuse |
| 4,564,232 A | 1/1986 | Fujimori et al. |
| 4,575,060 A | 3/1986 | Kitagawa |
| 4,591,203 A | 5/1986 | Furman |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,745,656 A | 5/1988 | Revlett |
| 4,757,655 A | 7/1988 | Nentoft |
| 4,767,647 A | 8/1988 | Bree |
| 4,805,272 A | 2/1989 | Yamaguchi |
| 4,807,335 A | 2/1989 | Candea |
| 4,817,999 A | 4/1989 | Drew |
| 4,819,983 A | 4/1989 | Alexander et al. |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,039,267 A | 8/1991 | Wollar |
| 5,100,015 A | 3/1992 | Vanderstuyf |
| 5,111,557 A | 5/1992 | Baum |
| 5,139,285 A | 8/1992 | Lasinski |
| 5,154,479 A | 10/1992 | Sautter, Jr. |
| 5,165,749 A | 11/1992 | Sheppard |
| 5,170,985 A | 12/1992 | Killworth et al. |
| 5,180,219 A | 1/1993 | Geddie |
| 5,208,507 A | 5/1993 | Jung |
| 5,212,853 A | 5/1993 | Kaneko |
| 5,234,122 A | 8/1993 | Cherng |
| 5,250,001 A | 10/1993 | Hansen |
| 5,297,322 A | 3/1994 | Kraus |
| 5,309,663 A | 5/1994 | Shirley |
| 5,333,965 A | 8/1994 | Mailey |
| 5,339,491 A | 8/1994 | Sims |
| 5,342,139 A | 8/1994 | Hoffman |
| 5,348,356 A | 9/1994 | Moulton |
| 5,368,427 A | 11/1994 | Pfaffinger |
| 5,368,797 A | 11/1994 | Quentin et al. |
| 5,397,206 A | 3/1995 | Sihon |
| 5,407,310 A | 4/1995 | Kassouni |
| 5,446,965 A | 9/1995 | Makridis |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,556,808 A | 9/1996 | Williams et al. |
| 5,566,840 A | 10/1996 | Waldner |
| 5,575,601 A | 11/1996 | Skufca |
| 5,577,301 A | 11/1996 | Demaagd |
| 5,577,779 A | 11/1996 | Dangel |
| 5,580,204 A | 12/1996 | Hultman |
| 5,586,372 A | 12/1996 | Eguchi et al. |
| 5,593,265 A | 1/1997 | Kizer |
| 5,601,453 A * | 2/1997 | Horchler .................. 439/567 |
| 5,629,823 A | 5/1997 | Mizuta |
| 5,634,757 A | 6/1997 | Schanz |
| 5,639,140 A | 6/1997 | Labrash |

(56) References Cited

U.S. PATENT DOCUMENTS

| | | |
|---|---|---|
| 5,657,516 A | 8/1997 | Berg et al. |
| 5,666,749 A | 9/1997 | Waters |
| 5,667,271 A | 9/1997 | Booth |
| 5,670,013 A | 9/1997 | Huang et al. |
| 5,698,276 A | 12/1997 | Mirabitur |
| 5,702,779 A | 12/1997 | Siebelink, Jr. et al. |
| 5,706,559 A | 1/1998 | Oliver |
| 5,736,221 A | 4/1998 | Hardigg et al. |
| 5,765,942 A | 6/1998 | Shiral et al. |
| 5,775,860 A | 7/1998 | Meyer |
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,846,631 A | 12/1998 | Nowosiadly |
| 5,915,678 A | 6/1999 | Slocum et al. |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,062,763 A | 5/2000 | Sirois et al. |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1 | 2/2001 | Culpepper et al. |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,283,540 B1 | 9/2001 | Siebelink, Jr. et al. |
| 6,286,214 B1 | 9/2001 | Bean |
| 6,289,560 B1 | 9/2001 | Guyot |
| 6,299,478 B1 | 10/2001 | Jones et al. |
| 6,311,960 B1 | 11/2001 | Pierman et al. |
| 6,318,585 B1 | 11/2001 | Asagiri |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,574 B1 | 3/2002 | Oliver et al. |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2 | 10/2002 | Aamodt et al. |
| 6,478,102 B1 | 11/2002 | Puterbaugh |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,821,091 B2 | 11/2004 | Lee |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,872,053 B2 | 3/2005 | Bucher |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2 | 10/2005 | Wilson |
| 6,959,954 B2 | 11/2005 | Brandt et al. |
| 6,966,601 B2 | 11/2005 | Matsumoto et al. |
| 6,971,831 B2 | 12/2005 | Fattori et al. |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,165,310 B2 | 1/2007 | Murakami et al. |
| 7,172,210 B2 | 2/2007 | Yokota |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | DiCesare |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren et al. |
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 7,959,214 B2 | 6/2011 | Salhoff |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |

(56) References Cited

U.S. PATENT DOCUMENTS

| | | |
|---|---|---|
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2 | 9/2012 | Takahashi et al. |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe |
| 8,480,186 B2 | 7/2013 | Wang |
| 8,511,707 B2 | 8/2013 | Amamori |
| 8,572,818 B2 | 11/2013 | Hofmann et al. |
| 8,579,141 B2 | 11/2013 | Tejima |
| 8,619,504 B2 | 12/2013 | Wyssbrod |
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,811,004 B2 | 8/2014 | Liu |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 2001/0016986 A1 | 8/2001 | Bean |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0052574 A1 | 3/2004 | Grubb |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yu |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0196535 A1 | 8/2008 | Dole |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0309388 A1 | 12/2009 | Ellison |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn et al. |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0207024 A1 | 8/2011 | Bogumil et al. |
| 2011/0239418 A1 | 10/2011 | Huang |

(56) References Cited

U.S. PATENT DOCUMENTS

| | | |
|---|---|---|
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0033493 A1 | 2/2014 | Morris et al. |
| 2014/0041176 A1 | 2/2014 | Morris |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |
| 2014/0132023 A1 | 5/2014 | Watanabe |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0208561 A1 | 7/2014 | Colombo et al. |
| 2014/0208572 A1 | 7/2014 | Colombo et al. |
| 2014/0220267 A1 | 8/2014 | Morris et al. |
| 2014/0264206 A1 | 9/2014 | Morris |
| 2014/0292013 A1 | 10/2014 | Colombo et al. |
| 2014/0298638 A1 | 10/2014 | Colombo et al. |
| 2014/0298640 A1 | 10/2014 | Morris et al. |
| 2014/0298962 A1 | 10/2014 | Morris et al. |
| 2014/0300130 A1 | 10/2014 | Morris et al. |
| 2014/0301103 A1 | 10/2014 | Colombo et al. |
| 2014/0301777 A1 | 10/2014 | Morris et al. |
| 2014/0301778 A1 | 10/2014 | Morris et al. |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0043959 A1 | 2/2015 | Morris |
| 2015/0050068 A1 | 2/2015 | Morris et al. |
| 2015/0052725 A1 | 2/2015 | Morris et al. |
| 2015/0056009 A1 | 2/2015 | Morris |
| 2015/0063943 A1 | 3/2015 | Morris |
| 2015/0069779 A1 | 3/2015 | Morris et al. |
| 2015/0086265 A1 | 3/2015 | Morris |
| 2015/0093177 A1 | 4/2015 | Morris |
| 2015/0093178 A1 | 4/2015 | Morris |
| 2015/0093179 A1 | 4/2015 | Morris et al. |
| 2015/0098748 A1 | 4/2015 | Morris et al. |
| 2015/0115656 A1 | 4/2015 | Lungershausen |
| 2015/0135509 A1 | 5/2015 | Morris et al. |
| 2015/0165609 A1 | 6/2015 | Morris et al. |
| 2015/0165985 A1 | 6/2015 | Morris |
| 2015/0165986 A1 | 6/2015 | Morris |
| 2015/0166124 A1 | 6/2015 | Morris |
| 2015/0167717 A1 | 6/2015 | Morris |
| 2015/0167718 A1 | 6/2015 | Morris et al. |
| 2015/0174740 A1 | 6/2015 | Morris et al. |
| 2015/0175091 A1 | 6/2015 | Morris et al. |
| 2015/0175217 A1 | 6/2015 | Morris et al. |
| 2015/0175219 A1 | 6/2015 | Kiester |
| 2015/0176759 A1 | 6/2015 | Morris et al. |
| 2015/0194650 A1 | 7/2015 | Morris et al. |
| 2015/0197970 A1 | 7/2015 | Morris et al. |
| 2015/0232130 A1 | 8/2015 | Colombo |
| 2015/0232131 A1 | 8/2015 | Morris et al. |
| 2015/0274217 A1 | 10/2015 | Colombo |
| 2015/0291222 A1 | 10/2015 | Colombo et al. |
| 2015/0375798 A1 | 12/2015 | Morris et al. |

FOREIGN PATENT DOCUMENTS

| | | |
|---|---|---|
| CN | 1129162 A | 8/1996 |
| CN | 2285844 Y | 7/1998 |
| CN | 1205285 A | 1/1999 |
| CN | 1204744 A | 7/1999 |
| CN | 1328521 A | 12/2001 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 2888807 Y | 4/2007 |
| CN | 1961157 A | 5/2007 |
| CN | 2915389 Y | 6/2007 |
| CN | 101005741 A | 7/2007 |
| CN | 200941716 Y | 8/2007 |
| CN | 200957794 Y | 10/2007 |
| CN | 101250964 A | 8/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326U U | 2/2012 |
| CN | 102540855 A | 7/2012 |
| CN | 102756633 | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 102886753 A | 1/2013 |
| CN | 102904128 A | 1/2013 |
| CN | 202686206 U | 1/2013 |
| CN | 102939022 A | 2/2013 |
| CN | 202764872 U | 3/2013 |
| CN | 202987018 U | 6/2013 |
| CN | 103201525 A | 7/2013 |
| CN | 103206595 A | 7/2013 |
| CN | 103206596 A | 7/2013 |
| CN | 203189459 U | 9/2013 |
| CN | 203344856 U | 12/2013 |
| CN | 104100609 A | 10/2014 |
| CN | 203991175 U | 12/2014 |
| DE | 1220673 B | 7/1966 |

(56) References Cited

FOREIGN PATENT DOCUMENTS

| | | |
|---|---|---|
| DE | 2527023 A1 | 12/1976 |
| DE | 2736012 A1 | 2/1978 |
| DE | 2703897 A1 | 8/1978 |
| DE | 2809746 A1 | 9/1979 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| DE | 102013003028 A1 | 3/2014 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2175626 A | 12/1986 |
| GB | 2281950 A | 3/1995 |
| GB | 2348924 A | 10/2000 |
| JP | H08200420 A | 8/1996 |
| JP | H0942233 A | 2/1997 |
| JP | 2000010514 A | 1/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 2001032454 A3 | 11/2001 |
| WO | 2004010011 01 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2013088447 A1 | 6/2013 |
| WO | 2013191622 A1 | 12/2013 |

OTHER PUBLICATIONS

"Coupling Types—Elastic Averaging." MIT. Aug. 3, 2012, [online], [retrieved on Nov. 12, 2014]. Retrieved from the Internet <URL:https//web.archive.org/web/20120308055935/http://pergatory.mit.edu/kinematiccouplings/html/about/elastic_averaging.html>.

"Elastic Averaging in Flexture Mechanisms: A Multi-Beam Paralleaogram Flexture Case-Study" by Shorya Awtar and Edip sevincer, Proceedings of IDETC/CIE 2006, Paper DETC2006-99752, American Society of Mechanical Engineers (ASME), Sep. 2006.

"Passive Alignment of Micro-Fluidic Chips Using the Principle of Elastic Averaging" by Sitanshu Gurung, Thesis, Louisiana State University, Dept. of Mechnical Engineering, Dec. 2007.

"Precision Connector Assembly Using Elastic Averaging" by Patrick J. Willoughby and Alexander H. Slocum, Massachusetts Institute of technology (MIT), Cambridge, MA, American Society for Precision Eingineering, 2004.

"The Design of High Precision Parallel Mechanisms Using Binary Actuation and Elastic Averaging: With Application to MRI Cancer Treatment" by L.M. Devita, J.S. Plante, and S. Dubowsky, 12th IFToMM World Congress (France), Jun. 2007.

Cross-sectional view of a prior art infrared welded assembly of BMW, Munich, Germany. Believed on the market since about Jan. 1, 2010, 1 page.

U.S. Appl. No. 13/973,587, filed Aug. 22, 2013, entitled "Elastic Averaging Alignment System and Method," inventors: Steven E. Morris and Jennifer P. Lawall.

U.S. Appl. No. 13/974,729, filed Aug. 23, 2013, entitled "Elastic Averaging Snap Member Aligning and Fastening System", inventors: Steven E Morris and Jennifer P. Lawall.

U.S. Appl. No. 14/012,205, filed Aug. 28, 2013, entitled "Elastically Deformable Alignment Fastener and System," inventors: Steven E. Morris, Marc J. Tahnoose, Michael E. McGuire and Jennifer P. Lawall.

Chinese Office Action for Application No. 201410450615.4 dated Nov. 30, 2015; 5 pgs.

Rojas, F.E., et al., "Kinematic Coupling for Precision Fixturing & Assembly" MIT Precision Engineering Research Group, Apr. 2013; 24 pgs.

Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013; 4 pgs.

Willoughby, P., "Elastically Averaged Precision Alignment", Degree of Doctor of Philosophy in Mechanical Engineering Dissertation, Massachusetts Institute of Technology, 2005; 158 pgs.

* cited by examiner

ELASTIC TUBE ALIGNMENT AND FASTENING SYSTEM FOR PROVIDING PRECISE ALIGNMENT AND FASTENING OF COMPONENTS

FIELD OF THE INVENTION

The subject invention relates to the art of alignment systems, more particularly to an elastically averaged alignment system, and even more particularly to an elastically averaged alignment system providing alignment and fastening of mating components on which the alignment system is incorporated.

BACKGROUND

Currently, components, particularly vehicular components such as those found in automotive vehicles, which are to be mated together in a manufacturing process are mutually located with respect to each other by alignment features that are oversized and/or undersized to provide spacing to freely move the components relative to one another to align them without creating an interference therebetween that would hinder the manufacturing process. One example includes two-way and/or four-way male alignment features, typically upstanding bosses, which are received into corresponding female alignment features, typically apertures in the form of holes or slots. There is a clearance between the male alignment features and their respective female alignment features which is predetermined to match anticipated size and positional variation tolerances of the male and female alignment features as a result of manufacturing (or fabrication) variances. As a result, significant positional variation can occur between the mated first and second components having the aforementioned alignment features, which may contribute to the presence of undesirably large variation in their alignment, particularly with regard to the gaps and spacing between them. In the case where these misaligned components are also part of another assembly, such misalignments can also affect the function and/or aesthetic appearance of the entire assembly. Regardless of whether such misalignment is limited to two components or an entire assembly, it can negatively affect function and result in a perception of poor quality.

To align and secure components, the aforementioned male and female alignment features may be employed in combination with separate screw boss features that serve to secure the components to each other. In such an assembly, the mating components are located relative to each other by the alignment features, and are fixed relative to each other by the separate screw boss features. Use of two separate sets of features, one for alignment and the other for securement, may limit the effectiveness of each set on a given assembly, as one set of features cannot be employed where the other one is employed.

Accordingly, the art of alignment and securement systems can be enhanced by providing an alignment system with an integrally arranged fastening system that can ensure both alignment and fastening of two components via elastic averaging of a single elastically deformable alignment and fastening element disposed in mating engagement with a corresponding single alignment feature.

SUMMARY OF THE INVENTION

In one exemplary embodiment of the invention, an elastically averaged alignment system includes a first component and a second component. The first component includes a first alignment member, an attachment element, and a support element. The attachment element and the support element are fixedly disposed with respect to the first alignment member, and the support element is disposed proximate the attachment element. The attachment element includes an attachment portion and an elastically deformable alignment element portion. The second component includes a second alignment member, an alignment aperture, and an engagement surface configured to engage with the support element. The elastically deformable alignment element portion is configured and disposed to interferingly, deformably and matingly engage the alignment aperture. The attachment portion includes a hollow tube having a first wall thickness, and the elastically deformable alignment element portion includes a hollow tube having a second wall thickness less than the first wall thickness. Portions of the elastically deformable alignment element portion when inserted into the alignment aperture elastically deform to an elastically averaged final configuration that aligns the first alignment member with the second alignment member in at least two planar orthogonal directions.

In another exemplary embodiment of the invention, a vehicle includes a body and an elastically averaged alignment system integrally arranged with the body. The elastically averaged alignment system includes a first component and a second component. The first component includes a first alignment member, an attachment element, and a support element. The attachment element and the support element are fixedly disposed with respect to the first alignment member, and the support element is disposed proximate the attachment element. The attachment element includes an attachment portion and an elastically deformable alignment element portion. The second component includes a second alignment member, an alignment aperture, and an engagement surface configured to engage with the support element. The elastically deformable alignment element portion is configured and disposed to interferingly, deformably and matingly engage the alignment aperture. The attachment portion includes a hollow tube having a first wall thickness, and the elastically deformable alignment element portion includes a hollow tube having a second wall thickness less than the first wall thickness. Portions of the elastically deformable alignment element portion when inserted into the alignment aperture elastically deform to an elastically averaged final configuration that aligns the first alignment member with the second alignment member in at least two planar orthogonal directions. A fastener having a thread portion and a head portion is threadably engaged with the attachment portion via the thread portion, and the head portion is disposed to constrain the second component in at least an axial direction with respect to a central axis of the attachment element;

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
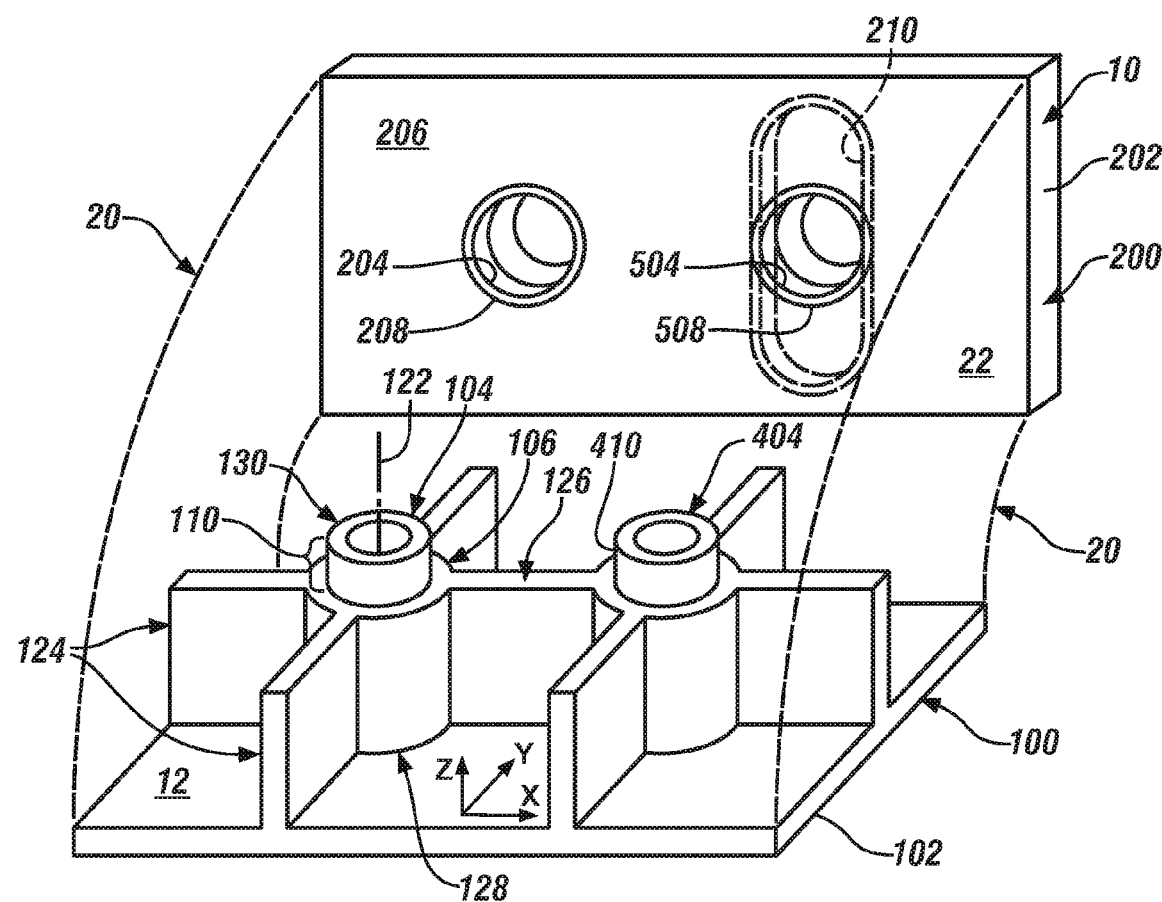
FIG. 1 depicts an isometric perspective of a disassembled assembly of an elastically averaged alignment system having a first component and a second component, in accordance with an embodiment of the invention.

The following description is merely exemplary in nature and is not intended to limit the present disclosure, its application or uses. For example, certain embodiments shown comprise vehicle body panels but the alignment and fastening system may be used with any suitable components to provide elastic averaging for precision location, alignment and fastening of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. In some embodiments, the elastically deformable component configured to have the at least one feature and associated mating feature disclosed herein may require more than one of such features, depending on the requirements of a particular embodiment. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned, co-pending U.S. patent application Ser. No. 13/187,675, the disclosure of which is incorporated by reference herein in its entirety. The embodiments disclosed above provide the ability to convert an existing component that is not compatible with the above-described elastic averaging principles, or that would be further aided with the inclusion of an elastic averaging and fastening system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

In accordance with an exemplary embodiment of the invention, and with reference to FIG. 1, an elastically averaged alignment system 10 includes a first component 100 having a first alignment member 102, an attachment element 104, and a support element 106 disposed proximate the attachment element 104, and further includes a second component 200 having a second alignment member 202, an alignment aperture 204, and an engagement surface 206 configured to engage with the support element 106. In an embodiment, the second alignment member 202 includes a chamfer 208 on its respective engagement side that circumscribes at least a portion of the alignment aperture 204 and serves to facilitate insertion of the attachment element 104.

Each of the attachment element 104 and the support element 106 are fixedly disposed with respect to the first alignment member 102, and in an embodiment are integrally formed with the first alignment member 102 to form a single part. The attachment element 104 includes an attachment portion 108 and an integrally formed elastically deformable alignment element portion 110 (best seen with reference to FIGS. 3 and 4). The elastically deformable alignment element portion 110 is configured and disposed to interferingly, deformably and matingly engage the alignment aperture 204 when the first and second components 100, 200 are mated together, which will be discussed in more detail below. The chamfer 208 serves to facilitate insertion of the elastically deformable alignment element portion 110 into the alignment aperture 204.

As depicted in FIG. 1, the attachment element 104 has a proximal end 128 disposed proximate the first alignment member 102, and a distal end 130 disposed distal to the first alignment member 120. In an embodiment, the distal end 130 includes a taper, which may be provided by a draft angle machined into a plastic injection molding machine designed to fabricate the first component 100, or may be otherwise provided by a structural taper feature at the distal end 130 of the attachment element 104, which would further serve to facilitate insertion of the elastically deformable alignment element portion 110 into the alignment aperture 204.

For discussion purposes, the mating side of the first alignment member 102 visible in FIG. 1 is labeled 12, and the mating side of the second alignment member 202 visible in FIG. 1 is labeled 22. The non-visible sides of the first and second alignment members 102, 202 that are hidden from view in FIG. 1 are herein referred to by reference labels 11 and 21, respectively. For discussion purposes, the 12 and 22 sides are herein referred to as front views, and the 11 and 21 sides are herein referred to as rear views. Dashed lines 20 represent direction lines that may be traversed as the first and second components 100, 200 are assembled with respect to each other.

Figure 2:
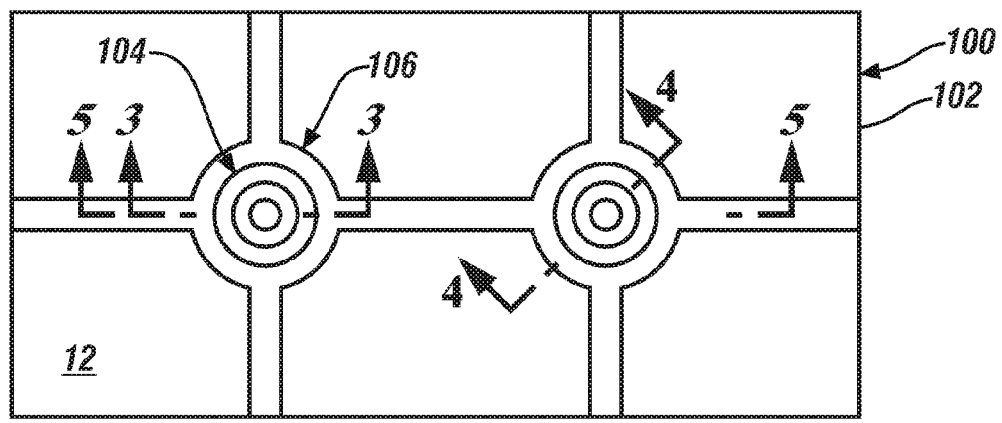
FIG. 2 depicts a front plan view of the first component of the disassembled assembly of FIG. 1, in accordance with an embodiment of the invention.
Figure 3:
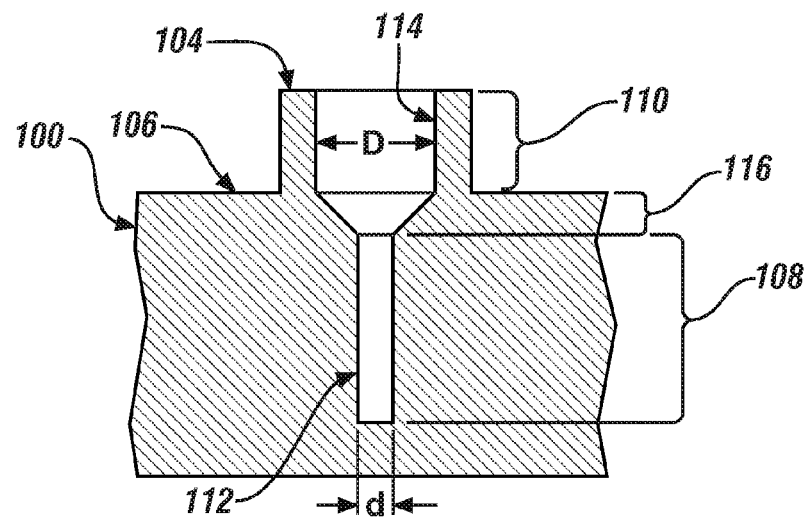
FIG. 3 depicts a cross-section view of a portion of the first component of FIGS. 1 and 2, in accordance with an embodiment of the invention.
Figure 4:
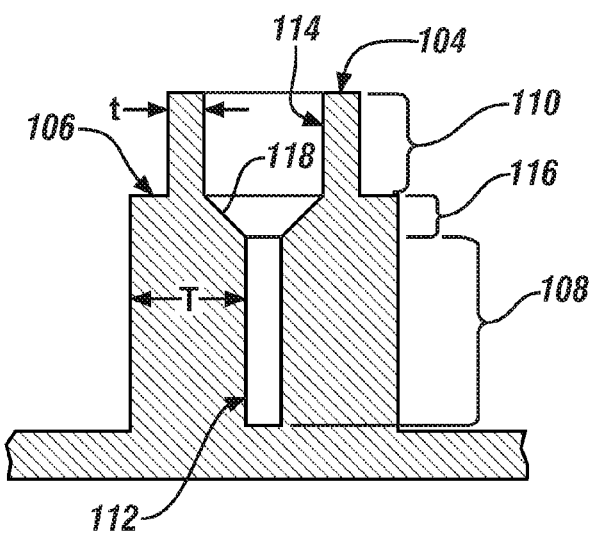
FIG. 4 depicts a cross-section view of another portion of the first component of FIGS. 1 and 2, in accordance with an embodiment of the invention.

Reference is now made to FIGS. 1-4 in combination, where FIG. 2 depicts a front plan view of side 12 of the first alignment member 102, FIG. 3 depicts a cross-section view through a portion of the first component 100 along the cut line 3-3 depicted in FIG. 2, and FIG. 4 depicts a cross-section view through another portion of the first component 100 along the cut line 4-4 depicted in FIG. 2. As depicted, the attachment portion 108 includes a hollow tube 112 having a first inside diameter "d" (best seen with reference to FIG. 3) and a first wall thickness "T" (best seen with reference to FIG. 4), and the elastically deformable alignment element portion 110 includes a hollow tube 114 having a second inside diameter "D" greater than the first inside diameter "d", where D>d, and a second wall thickness "t" less than the first wall thickness "T", where t<T. The attachment element 104 also includes a transition portion 116 disposed between the attachment portion 108 and the elastically deformable alignment element portion 110, where the inside diameter "D" transitions via a taper 118 to the inside diameter "d" to assist with the insertion of a fastener into the attachment portion 108, which will be discussed in more detail below. In an embodiment, the wall thickness "t" of the elastically deformable alignment element portion 110 extends down to at least the support surface of the support element 106.

Reference is now made to FIGS. 5-8.

Figure 5:
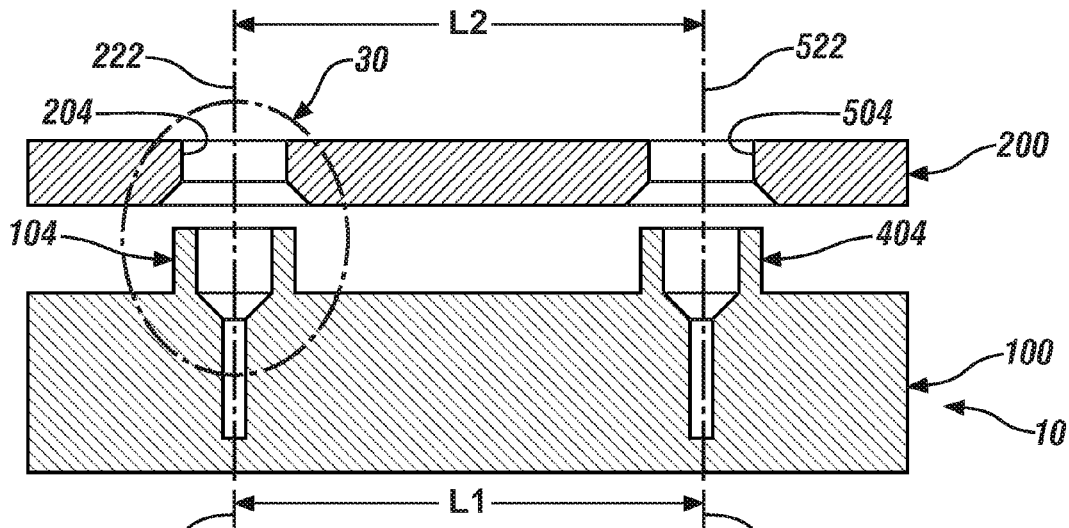
FIG. 5 depicts a cross-section view of another portion of the first component of FIGS. 1 and 2, in accordance with an embodiment of the invention.

FIG. 5 depicts a cross-section view through an elongated portion of the first component 100 along the cut line 5-5 depicted in FIG. 2, with an associated cross-section view of the second component 200 disposed in a pre-assembly orientation.

Figure 6:
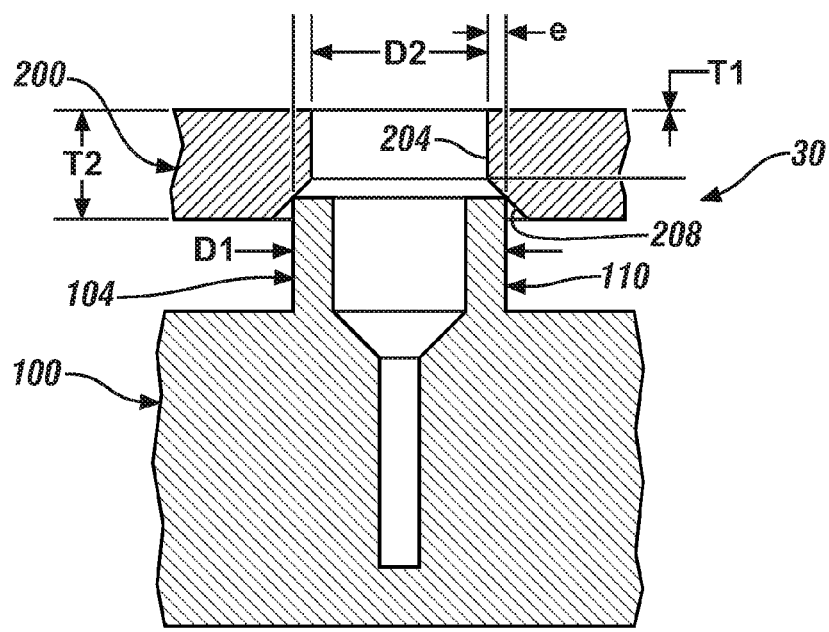
FIG. 6 depicts a cross-section view of a portion of the first and second components of FIG. 1 at a first stage of assembly just prior to the occurrence of elastic deformation, in accordance with an embodiment of the invention.

FIG. 6 depicts a cross-section view of the portions of the first and second components 100, 200 identified in detail—

30 in FIG. 5 just prior to engagement of the elastically deformable alignment element portion 110 with the alignment aperture 204. As depicted, the elastically deformable alignment element portion 110 has an outside dimension, in this instance diameter, D1 that is larger than the inside diameter D2 of the alignment aperture 204, such that a purposeful nominal circumferential interference of dimension "e" exists between the elastically deformable alignment element portion 110 and the alignment aperture 204. As depicted, the chamfer 208 has a depth of (T2–T1). In an embodiment, T1 is approximately equal to half of T2.

Figure 7:
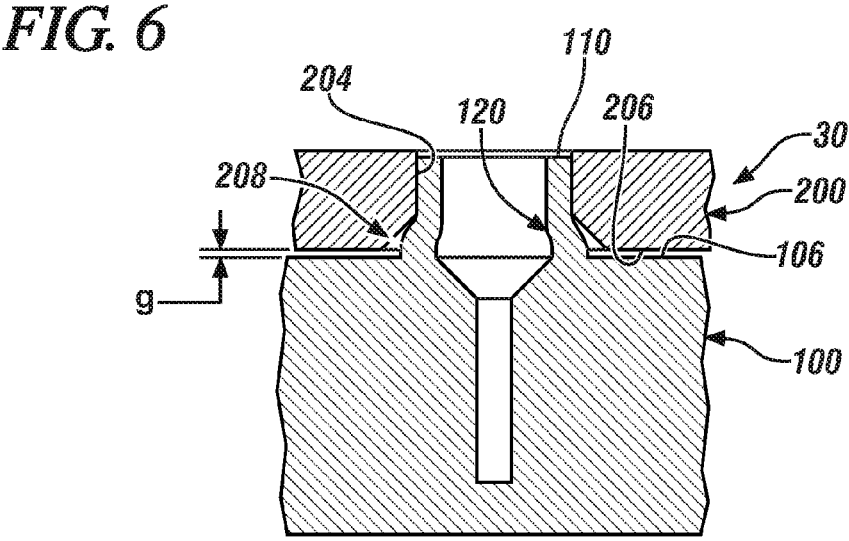
FIG. 7 depicts a cross-section view of the portion of the first and second components of FIG. 6 at a second stage of assembly after the occurrence of elastic deformation and just prior to full seating of the first and second components, in accordance with an embodiment of the invention.

FIG. 7 depicts the same portions of FIG. 6 but now in substantially complete engagement with each other as depicted by the partial gap "g" between the support surface of the support element 106 of the first component 100, and the engagement surface 206 (side 22) of the second component 200 (best seen with reference to FIG. 1). As depicted, the elastically deformable alignment element portion 110 has been interferingly, deformably and matingly engaged with the alignment aperture 204, resulting in elastic deformation as indicated by the deformation at 120. In an embodiment, the chamfer 208 not only serves to provide a lead-in for insertion of the elastically deformable alignment element portion 110 into the alignment aperture 204, but also provides a relief in the area of the deformation at 120, thereby permitting the first and second components 100, 200 to fully seat with respect to each other with the gap "g" being taken to zero. As would be expected with an elastically deformable alignment element portion 110 in the form of a circular hollow tube as illustrated, elastic deformation of the wall thickness "t" (see FIG. 4) necessarily must occur in order for the elastically deformable alignment element portion 110 to fit within the alignment aperture 204, which will now be discussed with reference to FIG. 8.

Figure 8:
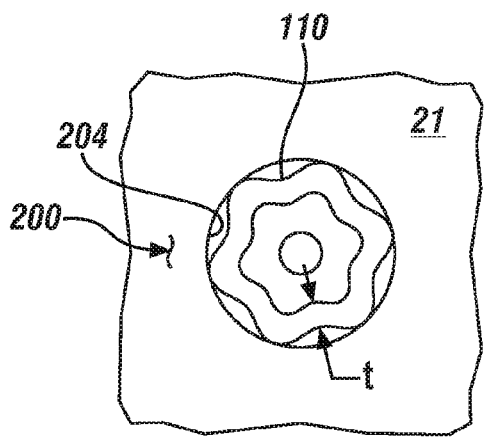
FIG. 8 depicts a rear side plan view of the assembly of FIG. 7 illustrating an embodiment with elastic deformation, in accordance with an embodiment of the invention.

FIG. 8 depicts a rear side plan view of a portion of side 21 of the second component 200 when the first and second components 100, 200 are engaged as depicted in FIG. 7. As depicted, the wall thickness "t" of the elastically deformable alignment element portion 110 is elastically deformed in a rippled manner, exaggerated for illustration purposes, to fit within the alignment aperture 204. While FIG. 8 depicts a certain number of deformation ripples, or lobes, it will be appreciated that the scope of the invention is not limited to the number of ripples or lobes illustrated, but also encompasses any manner of deformation consistent with an embodiment of the invention disclosed herein.

In view of the elastically deformable alignment element portion 110 and alignment aperture 204 depicted in FIGS. 2-8 being a circular hollow tube and a circular aperture, respectively, it will be appreciated that the resulting constraint provided by the elastically averaged alignment system 10 will result in four-way alignment. However, as indicated by the slotted aperture 210 illustrated in dashed line fashion in FIG. 1, it will be appreciated that the scope of the invention also encompasses two-way alignment. While the slotted aperture 210 is depicted in a vertical orientation (as viewed from the perspective of FIG. 1), it will be appreciated that the scope of the invention is not so limited, and also encompasses an arrangement where the slotted aperture 210 is oriented horizontal, or at any angle.

In view of the foregoing, it will be appreciated that an embodiment includes an elastically averaged alignment system 10 where portions of the elastically deformable alignment element portion 110 when inserted into the alignment aperture 204 elastically deform to an elastically averaged final configuration that aligns the first alignment member 102 with the second alignment member 202 in two planar orthogonal directions, such as the +/−x-direction or the +/−y-direction of an orthogonal coordinate system, for example, which is herein referred to as two-way alignment, and in another embodiment aligns the first alignment member 102 with the second alignment member 202 in four planar orthogonal directions, such as the +/−x-direction and the +/−y-direction of an orthogonal coordinate system, for example, which is herein referred to as four-way alignment.

Figure 9:
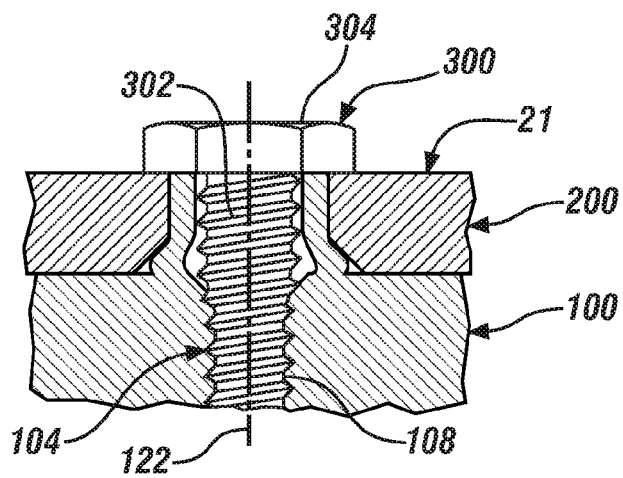
FIG. 9 depicts a cross-section view similar to that of FIG. 7 but after full seating of the first and second components and with a fastener engaged, in accordance with an embodiment of the invention.

Reference is now made to FIG. 9, which depicts a view similar to that of FIG. 7 but with first and second components 100, 200 being fully seated with respect to each other such that the gap "g" is zero, and with a fastener 300 having a thread portion 302 threadingly engaged with the attachment portion 108 and a head portion 304 seated against side 21 of the second component 200 so as to constrain the second component 200 in at least an axial direction with respect to a central axis 122 of the attachment element 104.

With reference back to FIG. 1, the support element 106 is illustrated as being a platform, or boss, that is part of the attachment element 104 and forms the wall thickness T" (see FIG. 4) of the attachment portion 108 with which the threaded fastener 300 engages. However, as also illustrated in FIG. 1 another support element 126 is provided by a plurality of ribs 124 that extend radially outward with respect to the central axis 122 of the attachment element 104. The ribs provide the radially extending support surfaces 126 that are configured to engage with the engagement surface 206 of the second component 200.

In view of the foregoing, it will be appreciated that an embodiment of the elastically averaged alignment system 10 provides an attachment element 104 and support element 106 in the form of a screw boss that not only elastically aligns with the alignment aperture 204, but also provides a fixation point and standoff support for the second component 200.

Alternative features of the foregoing description will now be discussed with reference to FIGS. 10-17.

Figure 10:
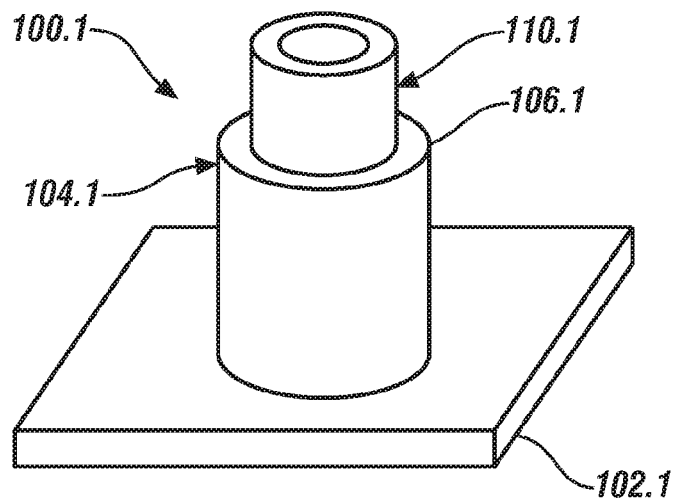
FIG. 10 depicts an isometric perspective of an alternative first component, in accordance with an embodiment of the invention.

FIG. 10 depicts an alternative first component 100.1 having an alignment member 102.1, an attachment element 104.1, and an elastically deformable alignment element portion 110.1, similar to the like named elements described above having like base reference numerals, but absent integrally formed ribs 124 (depicted in FIG. 1). A support element 106.1 having a ring-shaped support surface is disposed around the perimeter of and integrally formed with the elastically deformable alignment element portion 110.1 to provide an attachment element 104.1 that provides an elastically deformable screw boss. A cross-section view of the embodiment of FIG. 10 is represented by FIG. 4. The elastically deformable and attachment features described with reference to FIGS. 1-9 are equally applicable to the embodiment of FIG. 10.

Figure 11:
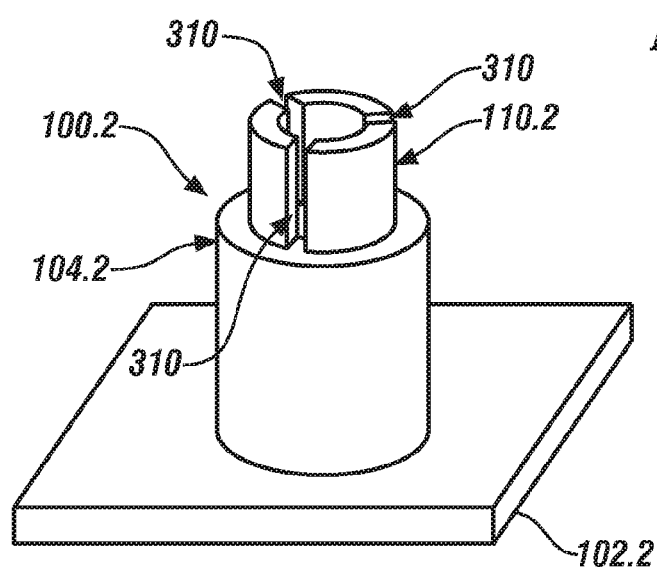
FIG. 11 depicts an isometric perspective of another alternative first component, in accordance with an embodiment of the invention.

FIG. 11 depicts an alternative first component 100.2 having an alignment member 102.2, an attachment element 104.2, and an elastically deformable alignment element portion 110.2, similar to the like named elements having like base reference numerals described in connection with FIG. 10, but having a plurality of slots 310 formed in the elastically deformable alignment element portion 110.2 in an axial direction with respect to the central axis 122 of the attachment element 104.2 (see reference numeral 122 in FIG. 9). The elastically deformable alignment element portion 110.2 with slots 310 is herein also referred to as a segmented tube. In the embodiment of FIG. 11, the slots 310 serve to reduce the stiffness of the walls of the elastically deformable alignment element portion 110.2, which is contemplated to reduce the degree of rippling (with reference to FIG. 8) of the elastically deformable alignment element portion 110.2 as it is interferingly, deformably, and matingly engaged with the alignment aperture 204 of the second component 200, by permitting the gaps of the slots 310 to at least partially close during assembly as each segment will tilt inward due to the interference fit condition. While FIG. 11 depicts only three slots 310 and associated three segments, it will be appreciated that the scope of the invention is not so limited, and also encompasses any number of slots and segments suitable for a purpose disclosed herein.

Figure 12:
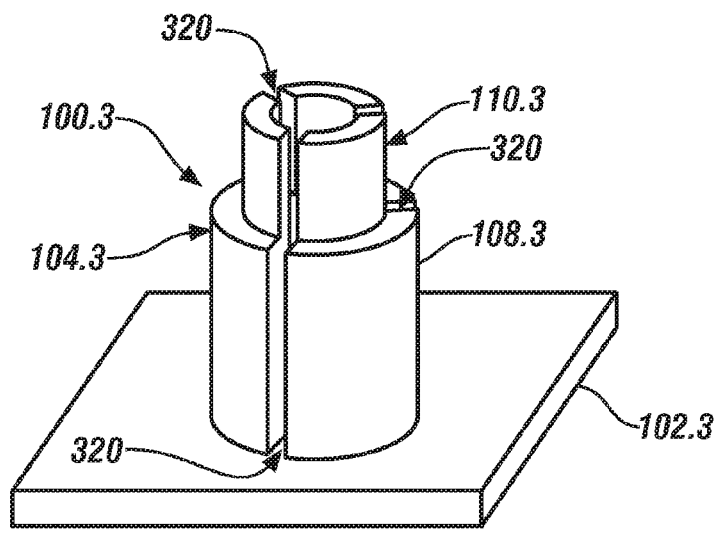
FIG. 12 depicts an isometric perspective of another alternative first component, in accordance with an embodiment of the invention.

FIG. 12 depicts an alternative first component 100.3 having an alignment member 102.3, an attachment element 104.3, and an elastically deformable alignment element portion 110.3, similar to the like named elements having like base reference numerals described in connection with FIG. 11, but having a plurality of slots 320 formed in both the elastically deformable alignment element portion 110.3 and the attachment portion 108.3 in an axial direction with respect to the central axis 122 of the attachment element 104.3 (see reference numeral 122 in FIG. 9). The elastically deformable alignment element portion 110.3 and attachment portion 108.3 with slots 320 are herein also referred to as a segmented tube. In the embodiment of FIG. 12, the slots 320 serve to reduce the stiffness of the walls of both the elastically deformable alignment element portion 110.3 and the attachment portion 108.3, which is contemplated to not only reduce the degree of rippling (with reference to FIG. 8) of the elastically deformable alignment element portion 110.3 as it is interferingly, deformably, and matingly engaged with the alignment aperture 204 of the second component 200 as discussed above, but also to provide a degree of bending from each segment of the attachment portion 108.3 for ease of assembly. While FIG. 12 depicts only three slots 320 and associated three segments, it will be appreciated that the scope of the invention is not so limited, and also encompasses any number of slots and segments suitable for a purpose disclosed herein.

Figure 13:
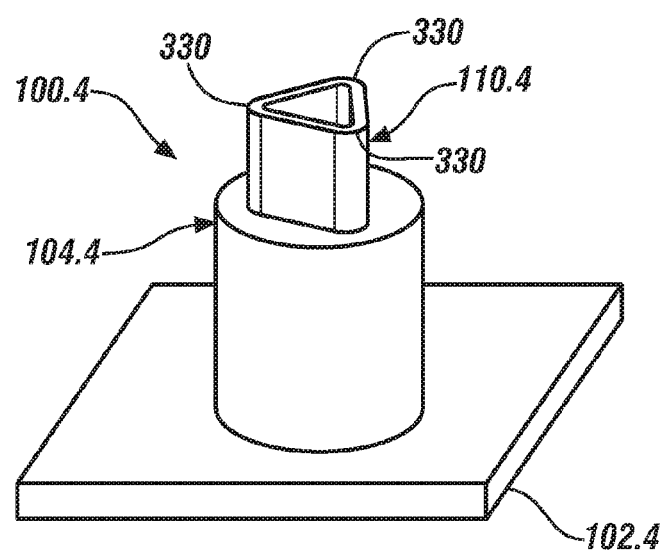
FIG. 13 depicts an isometric perspective of another alternative first component, in accordance with an embodiment of the invention.

FIG. 13 depicts an alternative first component 100.4 having an alignment member 102.4, an attachment element 104.4, and an elastically deformable alignment element portion 110.4, similar to the like named elements having like base reference numerals described in connection with FIG. 10, but having a plurality of lobes 330 formed in the elastically deformable alignment element portion 110.4. The lobes 330 extend outwardly with respect to the central axis 122 of the attachment element 104.1 (see reference numeral 122 in FIG. 9) in a manner and function fully described in co-pending patent application having Ser. No. 13/945,231, filed Jul. 18, 2013, which is herein incorporated by reference in its entirety. In the embodiment of FIG. 13, the lobes 330 serve to reduce the amount of surface contact with the associated alignment aperture 204 and allow space for the lobular tube 110.4 to deform into the gaps between the lobular tube 110.4 and the associated alignment aperture 204 without the walls of the lobular tube 110.4 collapsing in on itself, thereby reducing the degree of rippling (with reference to FIG. 8) of the elastically deformable alignment element portion 110.4 as it is interferingly, deformably, and matingly engaged with the alignment aperture 204 of the second component 200 as discussed above. While FIG. 13 depicts only three lobes 330, it will be appreciated that the scope of the invention is not so limited, and also encompasses any number of lobes suitable for a purpose disclosed herein.

With reference back to FIGS. 1 and 5 in combination, the first and second components 100, 200 may include not only a first attachment element 104 and first alignment aperture 204, but may also include a second attachment element 404 having features similar to those described above in connection with the first attachment element 104 such as a second elastically deformable alignment element portion 410, and a second alignment aperture 504 having features similar to those described above in connection with the first alignment aperture 204 such as a second chamfer 508, where the second elastically deformable alignment element portion 410 is configured and disposed to interferingly, deformably and matingly engage with the second alignment aperture 504 in a manner previously described. In FIG. 5, the distance between the central axis 122 of the first attachment element 104 and the central axis 422 of the second attachment element 404 is labeled "L1" (also herein referred to as a first defined distance), and the distance between the center 222 of the first alignment aperture 204 and the center 522 of the second alignment aperture 504 is labeled "L2" (also herein referred to as a second defined distance).

While FIGS. 1 and 5 depict only two attachment elements 104, 404 and two alignment apertures 204, 504, it will be appreciated that the scope of the invention is not so limited, and also encompasses three, four or more attachment elements and alignment apertures. In an embodiment having three attachment elements and three alignment apertures, relative rotation between the first and second components 100, 200 can be eliminated.

A first elastic averaging arrangement includes an elastic averaging system 10 where L1=L2, and where each of the first and second elastically deformable alignment element portions 110, 410 are slightly oversized with respect to their respective first and second alignment apertures 204, 504, thereby causing elastically averaged deformation of the first and second elastically deformable alignment element portions 110, 410 as they are interferingly, deformably and matingly engaged with their respective first and second alignment apertures 204, 504 in a manner described herein.

A second elastic averaging arrangement includes an elastic averaging system 10 where L1>L2 or L1<L2, and again where each of the first and second elastically deformable alignment element portions 110, 410 are slightly oversized with respect to their respective first and second alignment apertures 204, 504. In this second scenario, not only do the first and second elastically deformable alignment element portions 110, 410 undergo elastically averaged deformation as they are interferingly, deformably and matingly engaged with their respective first and second alignment apertures 204, 504 in a manner described herein, but they also experience a bending stress due to the mismatch between L1 and L2. By replacing each of the attachment elements 104, 404 interconnected with ribs 124 as depicted in FIG. 1 (herein referred to as reinforced attachment elements), with a slotted attachment element 104.3 absent any interconnected ribs as depicted in FIG. 12 (herein referred to as non-reinforced attachment elements), a lower bending stress in the attachment element can be achieved due to the presence of the slots 320. From the foregoing, it will be appreciated that embodiments of the invention utilizing non-ribbed screw bosses 104, 106, such as those depicted in FIGS. 10-17, that are employed in pairs where L1#L2, will experience a slight bending stress during assembly of the first and second components 100, 200.

Figure 14:
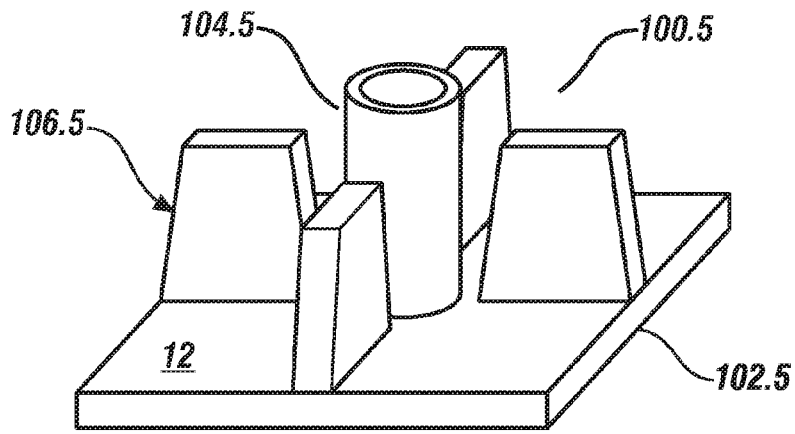
FIG. 14 depicts an isometric perspective of an alternative first component similar to that of FIG. 1, but having an attachment element separated from surrounding support elements, in accordance with an embodiment of the invention.
Figure 15:
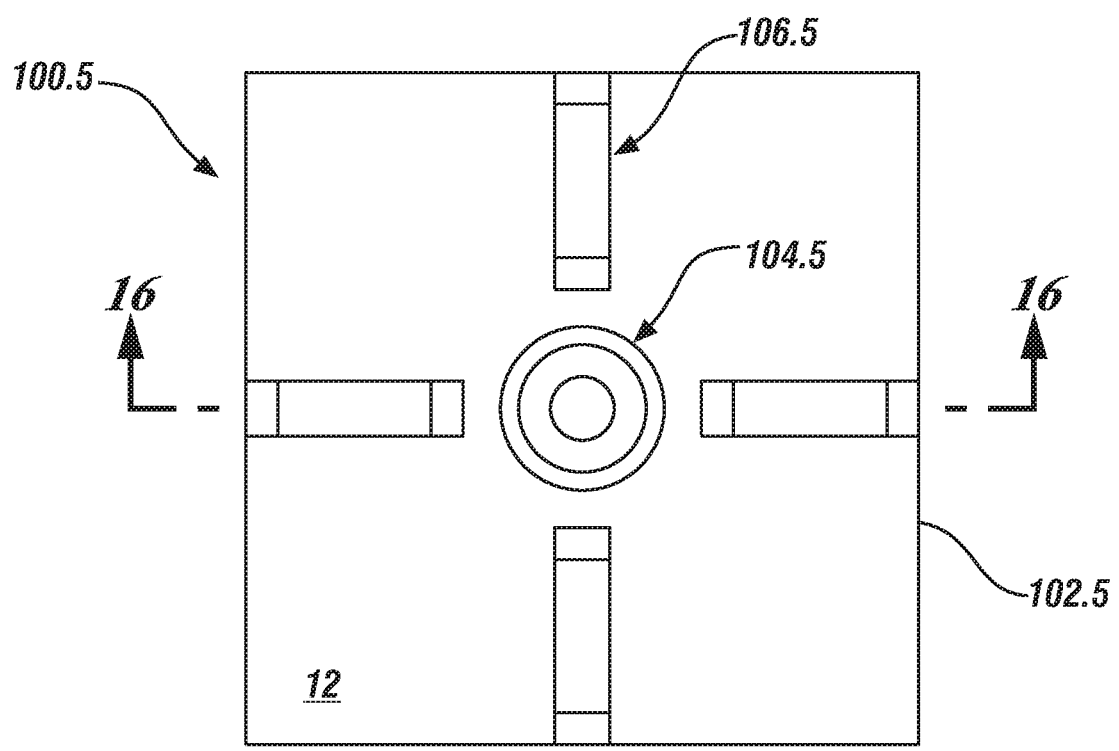
FIG. 15 depicts a front plan view of the first component of FIG. 14, in accordance with an embodiment of the invention.
Figure 16:
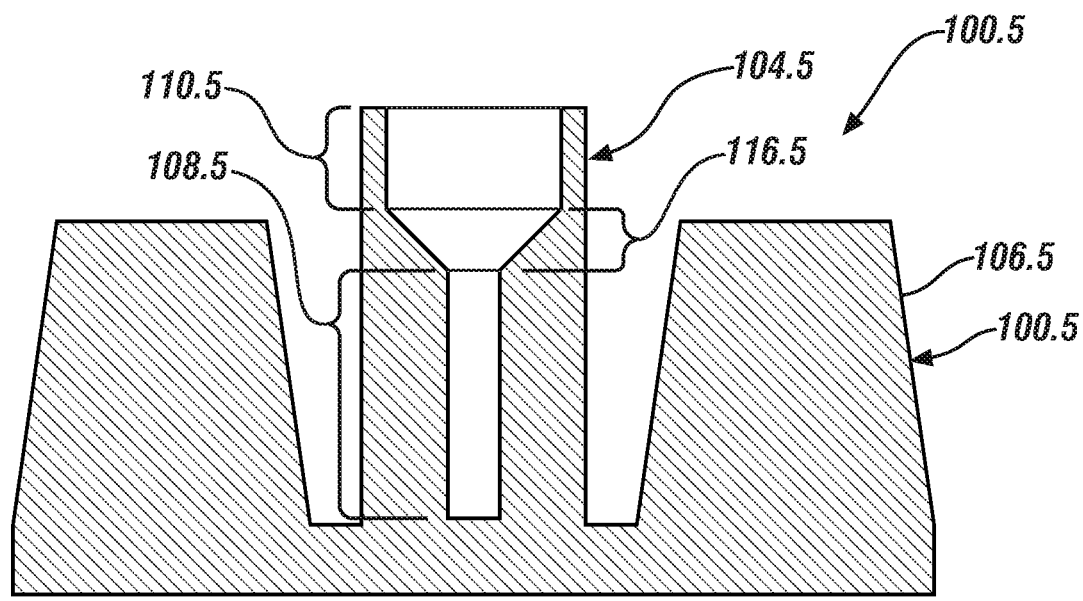
FIG. 16 depicts a cross-section view of the first component through a cut line depicted in FIG. 15, in accordance with an embodiment of the invention.
Figure 17:
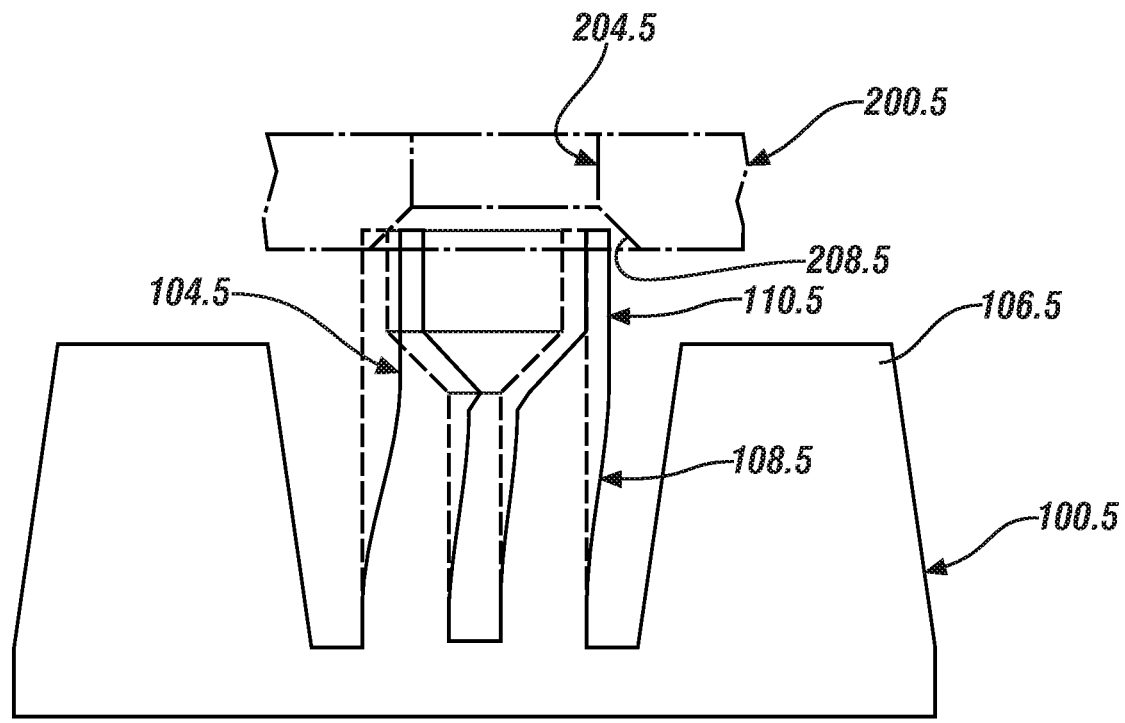
FIG. 17 depicts the cross-section view of FIG. 16 (cross-section lines omitted for clarity) in a partially assembled state with respect to a mating second component depicted in dotted line fashion, with dashed lines representing an undeformed state of assembly of the first component, and solid lines representing an elastically deformed state of assembly (exaggerated for illustration purposes) of the first component, in accordance with an embodiment of the invention.

While FIGS. 1-13 depict the support element 106 being integrally formed with the attachment element 104, it will be appreciated that the scope of the invention is not so limited and also encompasses an arrangement where the attachment element 104 and support element 106 are separated from each other, which will now be discussed with reference to FIGS. 14-17, where FIG. 14 depicts an isometric perspective of an alternative first component 100.5 having an attachment element 104.5 surrounded by a plurality of support elements 106.5, FIG. 15 depicts a front plan view of side 12 of the first component 100.5 of FIG. 14, FIG. 16 depicts a cross-section view of the first component 100.5 through cut line 16-16 depicted in FIG. 15, and FIG. 17 depicts the cross-section view of FIG. 16 in a partially assembled state with respect to a mating second component 200.5 (depicted in dot-dash line fashion) with dashed lines representing an un-deformed state of assembly of the first component 100.5 and solid lines representing an elastically deformed state of assembly (exaggerated for illustration purposes) of the first component 100.5. The cross-hatching in FIG. 17 has been omitted for clarity.

As illustrated, the attachment element 104.5 is separated from each support element 106.5, while both the attachment element 104.5 and the support elements 106.5 are integrally formed with the first alignment member 102.5. While FIGS. 14 and 15 depict four equally spaced support elements 106.5 having a trapezoidal shape, it will be appreciated that the scope of the invention is not so limited and encompasses any number, placement and shapes of support elements 106.5.

As depicted in FIG. 16, the attachment element 104.5 includes an elastically deformable alignment element portion 110.5, an attachment portion 108.5, and a transition portion 116.5, all having features and functions as described above. As depicted in FIG. 17, and in view of the attachment element 104.5 being separated from each support element 106.5, the attachment element 104.5, and more particularly the attachment portion 108.5, is permitted to elastically deform in a bending mode as the elastically deformable alignment element portion 110.5 interferingly, deformably and matingly engages with a slightly misaligned alignment aperture 204.5 of the mating second component 200.5. As discussed herein, a chamfer 208.5 assists with the lead in of the elastically deformable alignment element portion 110.5 into the alignment aperture 204.5. In an embodiment, the outer diameter of the elastically deformable alignment element portion 110.5 is slightly larger than the inner diameter of the alignment aperture 204.5, as depicted in FIG. 6, which results in elastically averaged deformation of the elastically deformable alignment element portion 110.5 once engaged with the alignment aperture 204.5, as depicted in FIG. 8. Accordingly, an embodiment includes an attachment element 104.5 configured to provide an elastically averaged alignment system 10 where the attachment element 104.5 is elastically deformed in both a compression mode and a bending mode, where L1 and L2 may not be equal.

While certain features have been described and illustrated herein in combination with other certain features, it will be appreciated that some features may be interchanged and or substituted and or combined with other features while remaining consistent with the disclosure herein and without detracting from the scope of the invention. For example, the attachment element 104.5 depicted in FIG. 16, or portions thereof, may include slots 310, 320 as depicted in FIGS. 11 and 12. All such combinations are contemplated and considered within the scope of the invention disclosed herein.

Figure 18:
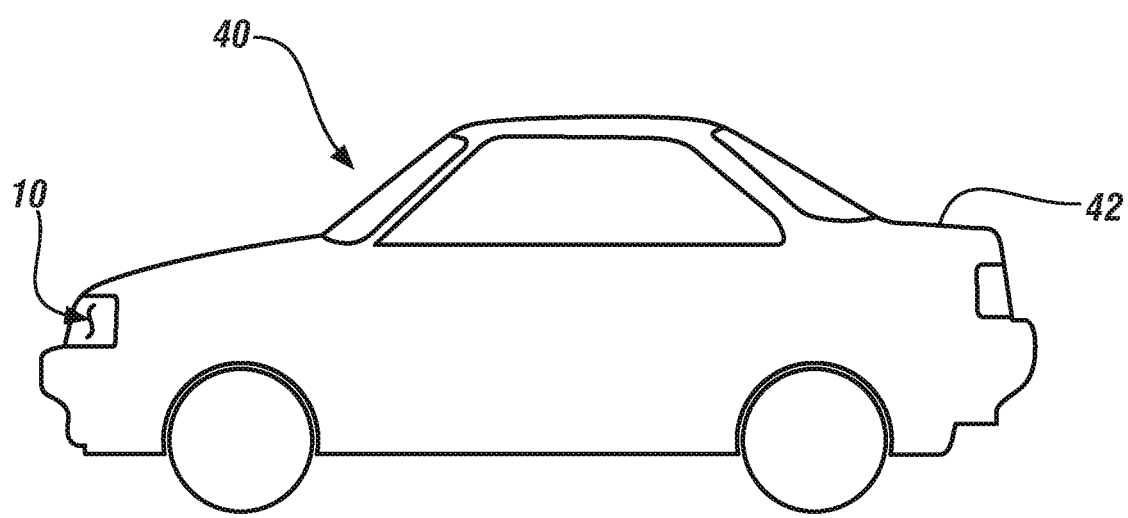
FIG. 18 depicts a vehicle with an elastically averaged alignment system, in accordance with an embodiment of the invention.

In view of all of the foregoing, and with reference now to FIG. 18, it will be appreciated that an embodiment of the invention also includes a vehicle 40 having a body 42 with an elastically averaged alignment system 10 as herein disclosed integrally arranged with the body 42. In the embodiment of FIG. 18, the elastically averaged alignment system 10 is depicted forming at least a portion of a front grill of the vehicle 40. However, it is contemplated that an elastically averaged alignment system 10 as herein disclosed may be utilized with other structural features of the vehicle 40, such as interior trim for example.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaged alignment system, comprising:
a first component comprising a first alignment member, an attachment element, and a support element, each of the attachment element and the support element fixedly disposed with respect to the first alignment member, the support element disposed proximate the attachment element, the attachment element comprising an attachment portion and an elastically deformable alignment element portion;
a second component comprising a second alignment member, an alignment aperture, and an engagement surface configured to engage with the support element;
wherein the elastically deformable alignment element portion is configured and disposed to interferingly, deformably and matingly engage the alignment aperture;
wherein the attachment portion comprises a hollow tube having a first wall thickness, and the elastically deformable alignment element portion comprises a hollow tube having a second wall thickness less than the first wall thickness; and
wherein portions of the elastically deformable alignment element portion when inserted into the alignment aperture elastically deform to an elastically averaged final configuration that aligns the first alignment member with the second alignment member in at least two planar orthogonal directions.

2. The elastically averaged alignment system of claim 1, further comprising:
a fastener comprising a thread portion and a head portion, the thread portion being threadingly engaged with the attachment portion, and the head portion being disposed to constrain the second component in at least an axial direction with respect to a central axis of the attachment element.

3. The elastically averaged alignment system of claim 1, wherein:
portions of the elastically deformable alignment element when inserted into the alignment aperture elastically deform to an elastically averaged final configuration that aligns the first alignment member with the second alignment member in four planar orthogonal directions.

4. The elastically averaged alignment system of claim 1, wherein:
the elastically deformable alignment element portion comprises a hollow tube having a circular axial cross-section with respect to a central axis of the attachment element.

5. The elastically averaged alignment system of claim 1, wherein:
the elastically deformable alignment element portion comprises a hollow tube having an axial cross-section comprising at least three outwardly oriented lobes with respect to a central axis of the attachment element.

6. The elastically averaged alignment system of claim 1, wherein:
the attachment portion comprises a hollow tube having a circular axial cross-section with respect to a central axis of the attachment element.

7. The elastically averaged alignment system of claim 1, wherein:
the hollow tube of the elastically deformable alignment element portion comprises at least one slot oriented in an axial direction with respect to a central axis of the attachment element.

8. The elastically averaged alignment system of claim 7, wherein:
the hollow tube of the attachment portion comprises at least one slot oriented in an axial direction with respect to a central axis of the attachment element.

9. The elastically averaged alignment system of claim 1, wherein:
the hollow tube of the elastically deformable alignment element portion comprises more than one slot oriented in an axial direction with respect to a central axis of the attachment element.

10. The elastically averaged alignment system of claim 1, wherein:
the attachment element is elastically deformable.

11. The elastically averaged alignment system of claim 1, wherein:
the support element is integral with the attachment element.

12. The elastically averaged alignment system of claim 1, wherein:
the support element comprises a ring-shaped support surface disposed around a perimeter of the attachment element and configured to engage with the engagement surface of the second component.

13. The elastically averaged alignment system of claim 1, wherein:
the support element comprises at least one rib that extends radially outward with respect to a central axis of the attachment element, the at least one rib having a radially extending support surface configured to engage with the engagement surface of the second component.

14. The elastically averaged alignment system of claim 1, wherein:
the attachment element and the support element are integrally formed with the first alignment member to form a single part.

15. The elastically averaged alignment system of claim 1, wherein:
the first component and the second component each have respective engagement sides relative to each other; and
the second alignment member comprises a chamfer on its respective engagement side that circumscribes at least a portion of the alignment aperture.

16. The elastically averaged alignment system of claim 1, wherein:
the attachment element comprises a proximal end proximate the first alignment member, and a distal end distal to the first alignment member, the distal end comprising a taper.

17. The elastically averaged alignment system of claim 1, wherein the attachment element is a first of a plurality of the attachment element, the support element is a first of a plurality of the support element, the alignment aperture is a first of a plurality of the alignment aperture, and further comprising:
a second of the plurality of the attachment element fixedly disposed with respect to the first alignment member, and spaced apart from the first of the plurality of the attachment element a first defined distance;
a second of the plurality of the support element fixedly disposed with respect to the first alignment member, and disposed proximate the second of the plurality of the attachment element;
a second of the plurality of the alignment aperture spaced apart from the first of the plurality of the alignment aperture a second defined distance;
wherein the elastically deformable alignment element portion of the second of the plurality of the attachment element is configured and disposed to interferingly, deformably and matingly engage the second of the plurality of the alignment aperture;
wherein portions of respective ones of the elastically deformable alignment element portion of each of the first and second of the plurality of the attachment element when inserted into respective ones of the first and second of the plurality of the alignment aperture elastically deform to an elastically averaged final configuration that further aligns the first alignment member with the second alignment member in at least two planar orthogonal directions; and
wherein a first portion of the second component is supported by the first of the plurality of the support element, and a second portion of the second component is supported by the second of the plurality of the support element.

18. The elastically averaged alignment system of claim 17, wherein the first defined distance is not equal to the second defined distance, and further wherein:
each elastically deformable alignment element portion of the first and second attachment elements are configured to elastically deform in bending, absent deformation in bending of each respective attachment portion, when the first and second components are mated to each other.

19. The elastically averaged alignment system of claim 17, wherein the first defined distance is not equal to the second defined distance, and further wherein:
each elastically deformable alignment element portion and each respective attachment portion of the first and second attachment elements are configured to elastically deform in bending when the first and second components are mated to each other.

20. A vehicle, comprising:
a body; and
an elastically averaged alignment system integrally arranged with the body, the elastically averaged alignment system comprising:
a first component comprising a first alignment member, an attachment element, and a support element, each of the attachment element and the support element fixedly disposed with respect to the first alignment member, the support element disposed proximate the attachment element, the attachment element comprising an attachment portion and an elastically deformable alignment element portion;
a second component comprising a second alignment member, an alignment aperture, and an engagement surface configured to engage with the support element;

a fastener comprising a thread portion and a head portion, the thread portion being threadingly engaged with the attachment portion, and the head portion being disposed to constrain the second component in at least an axial direction with respect to a central axis of the attachment element;

wherein the elastically deformable alignment element portion is configured and disposed to interferingly, deformably and matingly engage the alignment aperture;

wherein the attachment portion comprises a hollow tube having a first wall thickness, and the elastically deformable alignment element portion comprises a hollow tube having a second wall thickness less than the first wall thickness; and wherein portions of the elastically deformable alignment element portion when inserted into the alignment aperture elastically deform to an elastically averaged final configuration that aligns the first alignment member with the second alignment member in at least two planar orthogonal directions.

\* \* \* \* \*